Patented July 6, 1943

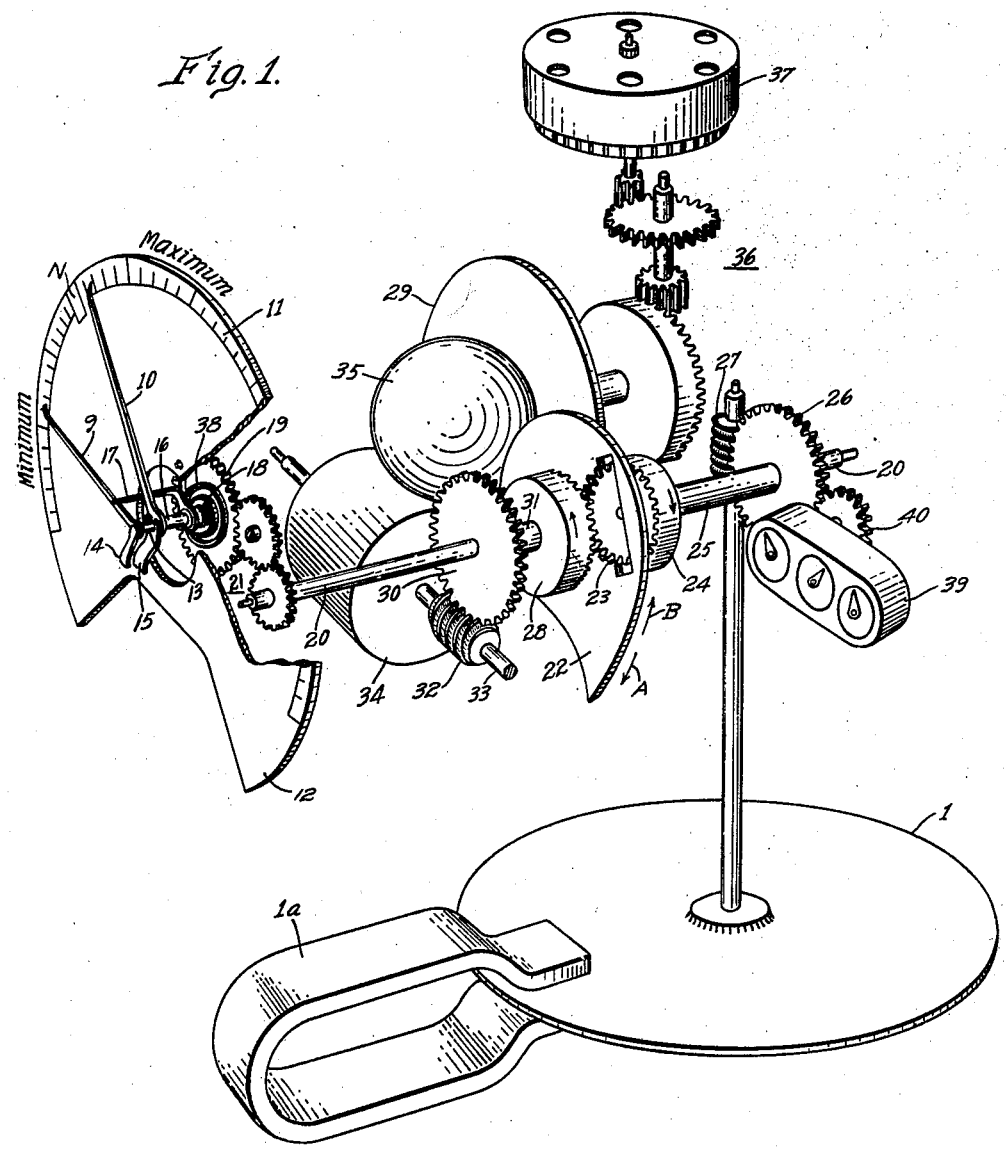

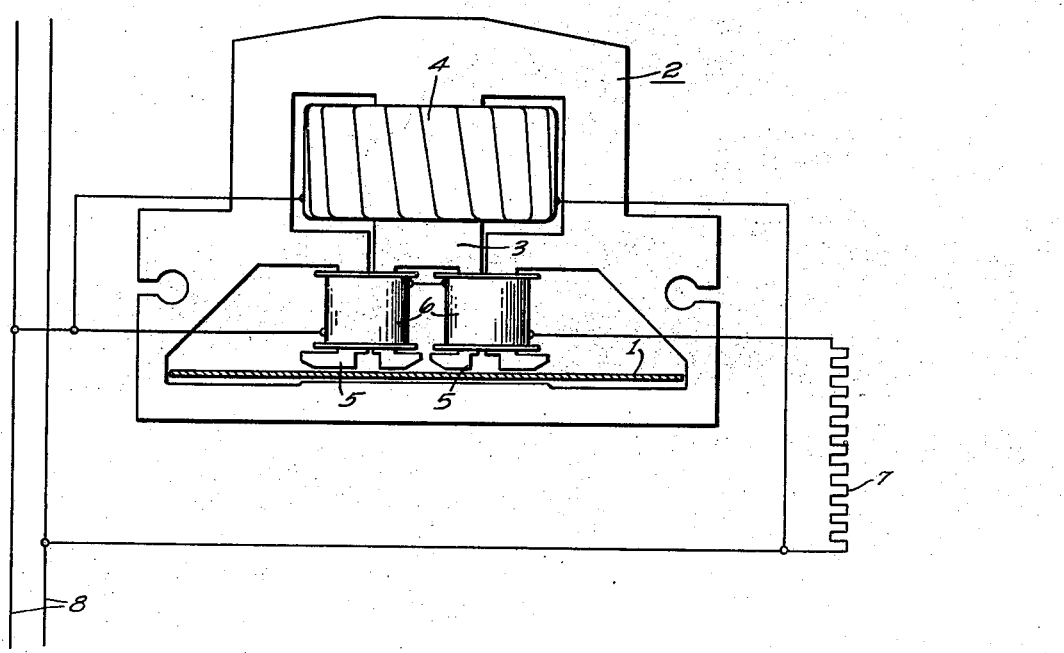

2,323,734

UNITED STATES PATENT OFFICE 2,323,734

MEASURING INSTRUMENT

Stanley Stokes, St. Louis, Mo., assignor to Westinghouse Electric & Manufacturing Company, East Pittsburgh, Pa., a corporation of Pennsylvania Application June 1, 1940, Serial No. 338,495

2 Claims. (Cl. 171—34)

This invention relates to electrical measuring instruments and it has particular relation to instruments for measuring extreme values of a variable electrical quantity.

For studying the performance of electrical circuits over substantial periods of time, it is customary to employ electrical recording instruments. Such instruments provide useful records but are open to numerous objections which seriously restrict their utilization.

Recording instruments not only are relatively expensive, but they require constant attention to assure proper ink supply to the recording pen and to replace charts. Such attention results in substantial inconvenience.

In accordance with this invention, indicating means are provided for indicating extreme values of a variable quantity such as voltage. Generally the instantaneous extreme value is not desired. This is for the reason that damage resulting from extreme values is not generally dependent upon the instantaneous extreme values. For example, electrical apparatus, when subjected to varying currents, heat and cool at rates which lag behind increases or decreases in the currents according to an exponential function. A heavy current damages such apparatus if the current duration is sufficient to bring the apparatus to a dangerous temperature. A momentary current surge may not seriously heat the apparatus. Consequently, it is preferable that the indicated maximum and minimum values show the average maximum or minimum value for an interval of time. This interval of time may be a fixed interval or it may be an interval dependent upon an exponential or logarithmic time function corresponding to that encountered in electrical apparatus. To this end the indicating members are not actuated in accordance with instantaneous values of voltage but are actuated at exponential or logarithmic time rates to value dependent upon the variations in voltage which they follow.

One of the most common electrical measuring devices is the watt responsive device commonly employed for measuring watts. This may take the form of a thermal wattmeter for measuring demand or of a mechanical type of integrating watthour meter. In accordance with this invention a watt responsive device is modified for measuring voltage. Such a modification may comprise the provision of a fixed load for the watt responsive device whereby the watt responsive device is responsive to a function of voltage.

For providing a suitable interval between variations in the energization of the watt responsive device and actuation of the indicating members, a suitable lagging mechanism may be employed. This lagging mechanism may take the form of the lag inherently present in a thermal wattmeter, or may take the form of a mechanical demand register of the exponential or logarithmic type. Because of the inherent high accuracy and ease of calibration of the mechanical type of demand register, such a register is particularly suitable.

It is accordingly an object of this invention to provide a device suitable for measuring extreme values of a variable quantity.

It is a further object of the invention to provide a device for indicating extreme values of voltage averaged over substantial intervals of time.

It is a further object of this invention to provide actuating mechanism of the watt responsive type for actuating indicating members in accordance with a function of voltage.

It is a still further object of this invention to provide means for actuating maximum and minimum voltage indicating members at a time rate corresponding to an exponential or logarithmic function.

Other objects of the invention will be apparent from the following description taken in conjunction with the accompanying drawings in which:

Figure 1 is a view in perspective with parts broken away of a meter embodying the invention, and Fig. 2 is a diagrammatic view showing connections suitable for the meter of Fig. 1.

Referring to the drawings, Fig. 1 shows an electroconductive armature or disk 1 of a meter which is actuated in accordance with a function of voltage. Such a meter may take the form illustrated in Fig. 2.

In Fig. 2 an electromagnet 2 is illustrated which is of the conventional watthour meter type. This electromagnet includes a voltage pole 3 having a voltage winding 4 thereon. The electromagnet also includes current poles 5 having current windings 6 associated therewith. When the voltage and current windings are energized in accordance with the voltage and current of an alternating current circuit, a shifting magnetic field is established in the air gap below the poles. As well understood in the art, the shifting magnetic field produces a torque on the armature or disk 1 which is proportional to the power in the circuit to which the electromagnet is connected. A conventional damping magnet 1a is provided for damping rotation of the disk 1.

In accordance with this invention, the electromagnet 2 is provided with a fixed load 7. This load may be a fixed resistance preferably having a negligible temperature coefficient of resistance. In order to reduce the current required for the electromagnet, it is desirable that the current windings 6 be designed for normal energization by a small current, such as one-fourth ampere. As illustrative of suitable proportions, the current winding 6 and the load 7 may have negligible inductance and an overall resistance of the order of 500 ohms when the electromagnet is employed for measurement purposes on circuits having voltages normally in the range of 100 to 120 volts.

When the electromagnet 2 is employed for measuring the voltage of an alternating current circuit 8, the connections may be as shown in Fig. 2. By reference to this figure it may be noted that the current through the voltage winding 4 is proportional to the voltage across the conductors of the circuit 8. The current flowing through the current winding 6 also is proportional to the voltage across the conductors of the circuit 8. Consequently, the torque acting on the armature or disk 1 and the rate of rotation thereof are proportional to the square of the voltage of the circuit 8.

For indicating the extreme values of the voltage employed for energizing the electromagnet 2, a pair of indicating members or pointers 9 and 10 are positioned adjacent a suitable scale 11 provided on a dial 12. The pointer 9 is mounted for rotation on a shaft 13 and is frictionally held in any position to which it is displaced in any suitable manner as by a biasing spring 14 which frictionally engages the hub of the pointer 9. The pointer 10 may be mounted loosely on the shaft 13 and biased by means of a suitable biasing spring 15 against a stationary sleeve 16 surrounding the shaft 13. The frictional engagement of the spring 15 with the hub of the pointer 10 retains the pointer 10 in any position to which it is displaced.

For actuating the pointers 9 and 10, an actuating element or pusher arm 17 is positioned therebetween and is carried by a collar 18 which is rotatably mounted on the sleeve 16. The collar 18 also carries a gear 19 whereby rotation of the gear moves the pusher arm 17 into engagement with either the pointer 9 or the pointer 10. This pusher arm 17 is connected through the gear 19 for actuation in accordance with rotation of the armature or disk 1.

As above indicated, it is desirable that the movements of the pointers 9 and 10, and consequently of the pusher arm 17, shall not be in accordance with minimum or maximum instantaneous values of voltage. Consequently mechanism is provided for actuating the pusher arm 17 at a rate which lags behind a variation in the rate of rotation of the armature or disk 1 in accordance with an exponential time function.

To this end a rotatably mounted shaft 20 is operatively connected to the gear 19 by suitable gearing 21. The shaft 20 also carries a cam 22 which serves as a spider for supporting a differential pinion 23. For controlling movement of the differential pinion 23 a crown gear 24 engages the pinion 23 and is carried by a collar 25 which is rotatably mounted on the shaft 20. The collar 25 also carries a gear 26 which engages a worm 27 on the shaft of the armature or disk 1. From the relationship of this gearing, it will be noted that the rotation of the crown gear 24 is proportional to the rotation of the armature or disk 1, and consequently is proportional to the square of the voltage of the circuit 8.

A second control for movement of the pinion 23 is provided by a crown gear 28 which is mounted for rotation through a variable coupling from a constant speed disk 29. Such rotation is provided by mounting the crown gear 28 and an auxiliary gear 30 on a collar 31 which is rotatably positioned on the shaft 20. The gear 30 engages a worm 32 which is secured to the shaft 33 of a drum 34 constituting the driven member of the variable coupling.

Variations in coupling between the disk 29 and the drum 34 are effected by movements of a coupling ball 35. It will be noted that when the ball 35 is positioned at the center of the disk 29, no rotation is transmitted from the disk 29 through the ball to the drum 34. With the ball 35 in this position, it follows that the gear 28 remains stationary. As the ball 35 is displaced from the center of the disk 29, the rate of rotation of the drum 34 and consequently of the crown gear 28 increases.

The position of the coupling ball 35 is controlled by the configuration of the surface of cam 22. This configuration of the surface of the cam 22 is substantially that of an involute curve.

Assuming that the rate of rotation of the crown gears 24 and 28 are substantially equal but in directions shown by the arrows, the cam 22 and the ball 35 remain substantially stationary. If the voltage of the circuit 8 subsequently increases, the rate of rotation of the armature or disk 1 increases and results in an increase in the rate of rotation of the crown gear 24. The increased rate of rotation of the crown gear 24 relative to the rate of rotation of the crown gear 28 results in a rotation of the cam 22 in the direction of the arrow A. This movement of the cam 22 is such that the coupling ball 35 is displaced further from the center of the disk 29. The displacement of the coupling ball 35 continues until the increased rate of rotation of the drum 34 produced thereby brings the rate of rotation of the crown gear 28 up to the new rate of rotation of the crown gear 24. The directions of rotation of these crown gears remain unchanged. The cam 22 then remains stationary until the voltage of the circuit 8 again changes. By proper tilting of the shaft 33, the ball 35 is urged against the cam 22 by gravity.

If the voltage of the circuit 8 should decrease, the rate of rotation of the crown gear 24 falls below that of the crown gear 28, and the cam 22 rotates in the direction of the arrow B. Such movement of the cam displaces the ball 35 towards the center of the disk 29 until the rates of rotation of the crown gears 24 and 28 again becomes equal.

It should be noted that the movements of the cam 22 are not linear with respect to time for a voltage change. Instead, the movements vary in accordance with an exponential time function. Since the actuating arm 17 is connected to the shaft 20 for rotation in accordance with rotation of the cam 22 it follows that the actuating arm 17 also moves in accordance with the aforesaid exponential function.

The exponential characteristic of the movements of the cam 22 and the shaft 20 may be found more fully explained in the Smith Patent 2,003,016 which is assigned to the Westinghouse Electric & Manufacturing Company. Because of this exponential characteristic, the register of Fig. 1 may be termed an exponentially lagged register or a logarithmic register.

The lagging of the register illustrated in Fig. 1 may be defined by the time required for the arm 17 to reach 90% of its final reading when the armature or disk 1 assumes a new and steady rate of rotation. For example, if the register requires 15 minutes to reach 90% of its final reading, it is termed a 15-minute register. By proper selection of the gears between the differential and the actuating arm 17, and between the differential and the disk 29 or the motor 37 for the disk 29 the interval for the register may be selected as desired.

Rotation of the disk 29 may be provided in any suitable manner. As illustrated, the disk is rotated through suitable gearing 36 from a small hysteresis-type synchronous motor 37.

In order to eliminate back lash in the gearing a spiral spring 38 may have one end attached to the collar 18 and a second end attached to the dial plate 12 in order to provide a weak bias in the same direction for all positions of the actuating arm 17.

An integrating register 39 also is provided for actuation through suitable gearing 40 from the armature or disk 1. This integrating register provides a record of the total revolutions of the armature or disk 1.

The operation of the apparatus thus far described may now be set forth. If it is desired to measure the voltage of the circuit 8 over a long interval, the electromagnet 2 is connected to the circuit. At the same time, the reading of the integrating register 39 is noted, and the pointers 9 and 10 are moved manually to a position corresponding to the normal voltage of the circuit 8, here represented by a mark N on the dial. At the end of the period for which the voltage survey is made, the reading of the integrating register 39 is noted and the readings of the pointers 9 and 10 on the dial 11 also are noted.

If the integrating register 39 is designed to measure watthours, the difference between the initial and final readings of the register is divided by the number of hours during which the survey was conducted, thus obtaining a quantity determined by the average watts for the voltage period. With the connections illustrated in Fig. 2 the watts are proportional to the square of the voltage of the circuit 8. Consequently the square root of the aforesaid quantity multiplied by the meter constant represents the average voltage of the circuit 8 for the period of the survey.

If the scale 11 is calibrated in watts, the square root of the reading of the pointer 9 multiplied by the meter constant represents the average integrated voltage for that 15-minute interval in which the voltage was lowest. Similarly, the square root of the reading of the pointer 10 multiplied by the meter constant represents the average integrated voltage for that 15-minute interval in which the voltage was highest.

If desired, the scale 11 may be calibrated directly in volts. This is permissible for the reason that no time factor is involved in the determination of their readings.

Although I have described the invention with reference to certain specific embodiments thereof, it is obvious that numerous modifications are possible. Therefore, the invention is not to be restricted except as required by the appended claims when interpreted in view of the prior art.

I claim as my invention:

1. In a device for providing indications of extreme values of voltage in an electrical circuit, a watthour meter unit connected for energization from said circuit and having a lagged actuating element movable at a rate corresponding to an exponential time function in response to a variation in wattage applied thereto, a fixed resistance load for said watthour meter unit, and voltage-calibrated means for indicating the extreme movements of said actuating element, said last-named means comprising a first member mounted for movement by said actuating element for decreasing values of said wattage, a second member mounted for movement by said actuating element for increasing values of said wattage, and means for retaining said members in any positions to which said members are moved.

2. In a device for providing indications of extreme voltage values in an electrical circuit, an integrating watthour meter unit, a fixed resistance load for said watthour meter unit, and an exponentially lagged maximum demand register operatively associated with said watthour meter unit, a minimum demand indicator, and means mounting said minimum demand indicator for operation by said lagged demand register.

STANLEY STOKES.